(12) United States Patent
Joseph

(10) Patent No.: US 11,761,651 B1
(45) Date of Patent: Sep. 19, 2023

(54) AIR CLEANING APPARATUS AND METHODS

(71) Applicant: Kuriakose T. Joseph, Philadelphia, PA (US)

(72) Inventor: Kuriakose T. Joseph, Philadelphia, PA (US)

(*) Notice: Subject to any disclaimer, the term of this patent is extended or adjusted under 35 U.S.C. 154(b) by 0 days.

(21) Appl. No.: 18/075,170

(22) Filed: Dec. 5, 2022

(51) Int. Cl.
  *B01D 47/00*  (2006.01)
  *F24F 8/133*  (2021.01)
  *B01D 47/06*  (2006.01)
  *B01D 47/02*  (2006.01)

(52) U.S. Cl.
  CPC ............ *F24F 8/133* (2021.01); *B01D 47/021* (2013.01); *B01D 47/06* (2013.01)

(58) Field of Classification Search
  CPC ...... B01D 47/06; B01D 47/021; B01D 53/14; F24F 8/133
  USPC .............................. 95/226; 96/329, 351–354
  See application file for complete search history.

(56) References Cited

U.S. PATENT DOCUMENTS

| | | | | |
|---|---|---|---|---|
| 2,405,494 A * | 8/1946 | Dupuy | ...................... | F24F 6/12 96/345 |
| 2,787,454 A * | 4/1957 | Coppola | .............. | B01D 47/021 261/122.1 |
| 3,653,186 A * | 4/1972 | McLendon | .............. | B01D 3/18 96/365 |
| 3,970,731 A * | 7/1976 | Oksman | ............ | B01F 23/23123 261/122.1 |
| 4,182,656 A * | 1/1980 | Ahnell | ...................... | C12Q 1/16 435/34 |
| 4,251,486 A * | 2/1981 | Sohda | ........................ | C02F 1/72 422/231 |
| 5,078,759 A * | 1/1992 | Kira | ...................... | B01D 47/021 261/121.1 |
| 5,858,072 A * | 1/1999 | Motoda | ................ | B01D 47/021 96/333 |
| 6,391,093 B1 * | 5/2002 | French | ............... | B23K 26/1435 96/353 |
| 6,626,983 B1 * | 9/2003 | Cairns | ........................ | F01N 3/04 96/336 |
| 8,128,742 B1 * | 3/2012 | McGuffin | ............... | B01D 47/04 96/353 |
| 8,313,564 B2 * | 11/2012 | Kwack | ................... | B01D 50/60 96/353 |
| 9,839,872 B2 | 12/2017 | Spartz | | |

(Continued)

*Primary Examiner* — Frank M Lawrence, Jr.
(74) *Attorney, Agent, or Firm* — CAESAR RIVISE, PC

(57) ABSTRACT

Air cleaning apparatus includes: a tank; a detergent inlet into the tank; a water inlet into the tank; an air inlet into the tank; at least one sparger in fluid communication with the air inlet; a vacuum pump; an air outlet in fluid communication with the vacuum pump; and at least one valve between the air outlet and the vacuum pump and configured to control flow of fluids through the air outlet. The apparatus is configured to conduct a method to pull polluted external air into the tank through the air inlet to the at least one sparger, sparge bubbles of the polluted air from the at least one sparger into a mixture of the water and the nonfoaming detergent in the tank, remove pollutants from the air as it rises through the mixture, extract clean air from the mixture into a cavity in the tank above the mixture and extract the clean air from the cavity through the air outlet to an external environment with the vacuum pump.

19 Claims, 1 Drawing Sheet

(56) References Cited

U.S. PATENT DOCUMENTS

| | | | |
|---|---|---|---|
| 10,456,736 B2 * | 10/2019 | Zhu | B01D 53/1406 |
| 2006/0107449 A1 * | 5/2006 | Lan | E03D 9/05 |
| | | | 4/213 |
| 2010/0263672 A1 * | 10/2010 | Acharya | B01D 47/021 |
| | | | 96/351 |

* cited by examiner

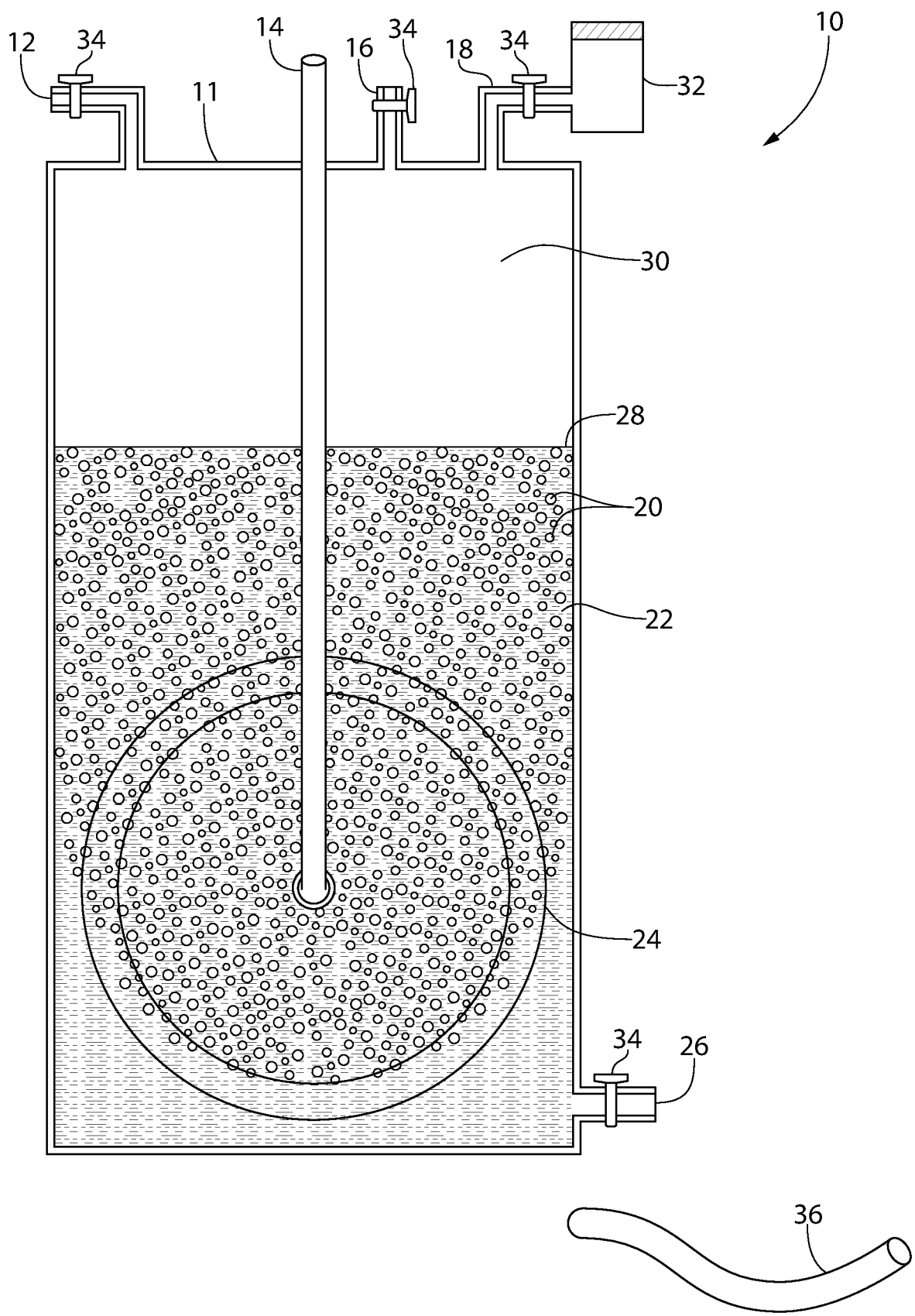

AIR CLEANING APPARATUS AND METHODS

BACKGROUND OF THE INVENTION

1. Field of Invention

This invention relates to an air cleaning apparatus and methods of use to remove odor and particulates including oil, vapors, toxins, and microbes from any space to produce clean and odorless air.

2. Description of Related Art

Many air purifying apparatuses have been designed for industrial settings.

In the industrial setting, exhaust gases have been purified using absorbents, scrubbers, or other processes. For example, U.S. Pat. No. 9,839,872 B2 discloses a purification station wherein a stream of exhaust gas passes through the station including a scrubbing solution. This process generates gas that can be released to the atmosphere, such as that in compliance with Clean Air Act provisions or similar quality requirements. However, the '872 Patent uses absorbers such as formaldehyde, which can pose a risk in the household setting.

In living spaces, solution trapping of dust and debris from floors, carpeting, or upholstery has been carried out with vacuum cleaners designed to utilize a water reservoir. While use of such machinery can trap more debris than standard vacuums, such purifying is more effective on surfaces and does not address the issue of particulates in the surrounding air.

Current techniques for reducing airborne particulates in indoor environments typically employ HEPA (High-Efficiency Particulate Air) filtration or other filtering arrangements that use the weave of a material to collect dust and other particulates. This often requires replacement of the purifying device at specified intervals. Reduction of airborne chemicals is conventionally addressed by utilizing carbon-based or molecular sieve-based materials to adsorb or chemisorb harmful vapors or gases from the ambient air. These filters, however, must be frequently replaced on a prescribed basis.

Existing purification systems for indoor air, however, have limited trapping capability and/or efficiency for airborne contaminants such as volatile chemicals, including formaldehyde, harmful gases, and/or for the removal of acids or bases from air. In addition, many existing purification systems require very high flow rates to be even partly successful. Cumbersome cleaning requirements and/or frequent and costly filter cartridge replacements are other disadvantages associated with conventional indoor air purifiers.

Even with such improvements, there remains a need for an apparatus and method that utilizes a simpler design to provide a more accessible, safe, and cost-effective way for consumers to clean air in settings such as home kitchens, hotel, restaurants, and other significant odor and pollutant producing areas in commercial and industrial buildings.

All references cited herein are incorporated herein by reference in their entireties.

BRIEF SUMMARY OF THE INVENTION

A first aspect of the invention is an air cleaning apparatus including a tank; an inlet capable of receiving a nonfoaming detergent; an inlet capable of receiving water; an air inlet; at least one sparger; a vacuum pump; an air outlet; and optionally a drainage portal.

In certain embodiments, the tank includes a material including at least one of a glass, plexiglass, quartz, porcelain, stainless steel, thick-walled plastic, and fiberglass, wherein the material is capable of withstanding vacuum pressure.

In certain embodiments, the sparger is a sintered disk.

In certain embodiments, the disk sparger includes at least one of air bubble stones, aluminum, titanium, and steel. In certain preferred embodiments, a specially designed disk sparger with several branches, or leaves, connected around the air inlet tube and covering the entire bottom of the tank is used. Further, in certain embodiments, the pores of the disk sparger could be made bigger to minimize clogging up of the sparger in case some minute particles are there in the incoming air in some dusty areas. These minute particles would be retarded by the water in the tank. The bigger pores would make the passing of the air and the formation of the bubbles much easier.

In certain embodiments, the drainage portal further includes tubing extending from the drainage portal to the external environment outside the apparatus such as a drainage sink.

In certain embodiments, the inlet capable of receiving water further includes tubing externally extending from the inlet capable of receiving water, wherein the tubing permits the air cleaning apparatus to be connected to a water source.

In certain embodiments, the inlet capable of receiving a nonfoaming detergent, the inlet capable of receiving water constitute a single inlet capable of fulfilling both tasks. In certain embodiments, the detergent and water can be fed into the apparatus as a premixture combined outside the apparatus.

A second aspect of the invention is a method of use of the air cleaning apparatus including a) partially filling said tank with a mixture of water and nonfoaming detergent, wherein the water is poured into the tank through said inlet capable of receiving water and the nonfoaming detergent is poured into the tank through said inlet capable of receiving the nonfoaming detergent; b) activating said vacuum pump, wherein the vacuum pump pulls polluted air through the air inlet tube and at least one disk sparger and said mixture of water and nonfoaming detergent, wherein the disk sparger produces a plurality of polluted small air bubbles and the small air bubbles rise up in the mixture of water and nonfoaming detergent; c) dissolving and/or retaining in the mixture of water and nonfoaming detergent pollutants from the small air bubbles; and d) pulling through the air cavity and the vacuum pump clean air from an air cavity above the mixture of water and nonfoaming detergent within the tank, wherein the pollutants within the small air bubbles remain in the mixture of water and nonfoaming detergent. The sparger produces numerous, very fine, tiny air bubbles, and the bubbles rise up in the detergent water. The pollutants, such as odor-causing materials, oil, or vapor, dissolve away in the water with the help of the detergent and is extracted or retained from the air bubbles. Clean and odorless air escapes at the top of the water and the vacuum pump pulls out the air into the open space outside the tank. No odor is detectable at the vacuum outlet of the vacuum pump, which indicates the apparatus is working as expected. Other ingredients, such as vinegar, ethanol, isopropanol, dialdehydes and others, which could kill germs, microbes, microorganisms, etc., could also be added in the water.

In certain uses of the apparatus, if used for several days, droplets of oil appear on top of the water, further indicating removal of the materials from the air by formation of byproducts with the detergent in the water. After extended use of the apparatus, the water becomes discolored (dirty looking) indicating that pollutants, oils, vapors, particulates, microbes, bacteria, etc. have been dissolved or retained in the water. Occasionally, if left standing for several days of use, droplets of oil-like material may appear on top of the water. These phenomena prove that the apparatus is working for the removal of these materials from the incoming pollutant air. Some of these things appeared in the water could be byproducts formed with the detergent in the water. In certain uses, the air released out of the air outlet is odorless.

In certain embodiments, the nonfoaming detergent is used in an amount selected from the range of 1-6 percent of the mixture of water and nonfoaming detergent.

In certain embodiments, step b) of the method further includes adjusting the strength of the air flow out of the air outlet with a valve.

In certain embodiments of the method, the disk sparger is a sintered disk.

In certain embodiments, the method further includes draining the mixture of water and nonfoaming detergent through the drainage portal.

In certain embodiments, the mixture of water and nonfoaming detergent is drained into a drainage sink.

In certain embodiments, the disk sparger includes at least one of air bubble stones, aluminum, titanium, and steel.

A third aspect of the invention is a method of assembling the air cleaning apparatus of the invention including a) providing said tank; b) providing said air inlet; c) providing said inlet capable of receiving nonfoaming detergent; d) providing said inlet capable of receiving water; e) providing said air outlet; f) providing said drainage portal; g) providing said disk sparger in fluid communication with the air inlet; and h) providing said vacuum pump in fluid communication with the air outlet.

In certain embodiments, the method further includes coupling tubing to the inlet capable of receiving water, wherein the tubing is coupled to an external facing portion of the inlet.

In certain embodiments, the method further includes coupling tubing to the drainage portal, wherein the tubing is coupled to an external facing portion of the drainage portal.

In certain embodiments, the method further includes providing a valve between the air outlet and the vacuum pump.

BRIEF DESCRIPTION OF THE DRAWING

The invention will be described in conjunction with the following drawing in which like reference numerals designate like elements and wherein:

FIG. 1 is a schematic cross-sectional view of an embodiment of the air cleaning apparatus.

DETAILED DESCRIPTION OF PREFERRED EMBODIMENTS OF THE INVENTION

The invention provides an apparatus including a tank; an inlet capable of receiving a nonfoaming detergent; an inlet capable of receiving water; an air inlet; at least one disk sparger; a vacuum pump; an air outlet; and a drainage portal.

In certain examples, the tank is of a material capable of withstanding vacuum pressure, including but not limited to glass, plexiglass, quartz, porcelain, stainless steel, thick-walled plastic, and fiberglass. In other examples, the tank is quartz, porcelain, stainless steel, or fiberglass, and further includes a glass or plexiglass window, enabling the user to see the coloring of the water inside the tank. When the water inside the tank reaches a predetermined pollution state (i.e., begins to appear darker in color, indicating the water is dirty), the user is alerted that pollutants have been removed from the air and absorbed into the water, and the water in the tank needs to be changed.

In certain examples, the tank is of a size appropriate for portable, household use. For example, the tank is able to sit on a kitchen countertop. The size of the base of the tank for countertop use is approximately 1'×1' or smaller, with a height up to approximately 2 feet. In other examples, however, the tank may be larger for use on the floor or in office or other commercial settings, with each side of the base reaching up to 3 feet in length or width, and the tank reaching 3-4 feet in height. In still further embodiments, the apparatus is of a narrow length and width but employs increased height to permit better aeration of the liquid within the apparatus. As a specific non-limiting example, a floor model of the apparatus includes a 1'×1' base with a 3'-4' height to permit a greater air cavity within the tank.

The tank includes an inlet capable of receiving nonfoaming detergent. In certain nonlimiting examples, the nonfoaming detergent is nonfoaming automatic dishwasher detergent soap. In these examples, filling the tank is inexpensive, as the nonfoaming detergent is a formulation found in most households. The tank additionally includes an inlet capable of receiving water. In certain examples, the inlet capable of receiving nonfoaming detergent and the inlet capable of receiving water are the same inlet, whereas in other examples, they are separate inlets. The inlets include tubes, valves, ports, or other similar intake structures. In other examples, the inlet capable of receiving water may be directly connected to a waterline. The user of the apparatus is then able to pour nonfoaming detergent and water into the tank, wherein the nonfoaming detergent comprises up to about 1-6% of the detergent-water mixture and preferable 4%. In certain examples, the inlet capable of receiving water further includes tubing coupled to the inlet, wherein the tubing can be connected to a water source such as a hose or faucet, permitting a user to easily fill the tank.

The apparatus additionally includes an air inlet, wherein air from the room surrounding the apparatus enters the tank. The apparatus additionally includes an air outlet, wherein the air outlet permits clean air to exit the tank. The air inlet includes any of a tube, valve, port, or similar air intake structure. The air outlet includes any of a tube, valve, port, or similar air outlet structure.

The apparatus further includes a disk sparger to produce a plurality of bubbles (e.g., numerous very fine tiny bubbles) from the inlet air and dissipate them through the nonfoaming detergent water as it rises up. The pollutants are retained (e.g., dissolved) in the detergent water and clean air escapes from the detergent water to the air cavity above the water. In certain examples, the disk sparger is a sintered disk. In certain examples, the disk sparger is made of a material including but not limited to air bubble stones, aluminum, titanium, or steel. The disk sparger is submerged within the solution of water and nonfoaming detergent, and, in preferred examples, is located at or near the bottom of the tank.

The apparatus further includes a vacuum pump. The vacuum pump is situated outside the tank and coupled to the air outlet. In preferred examples, a valve is provided between the air outlet and the vacuum pump to permit the vacuum pump air flow to be turned on, shut off, or adjusted.

The vacuum pump pulls clean air out of the tank, creating a vacuum within the tank that enables polluted air entering the tank to be sparged by the disk sparger into the mixture of water and nonfoaming detergent. The disk sparger injects into the mixture of water and nonfoaming detergent numerous, fine, tiny bubbles of polluted air, which are stripped of pollutants as they rise through the mixture. Pollutants are retained (at least to some extent) within the mixture of water and nonfoaming detergent. Clean air is pulled by the vacuum pump from the mixture into the air cavity and out through the air outlet and vacuum pump into the surrounding atmosphere. In certain embodiments, the vacuum pump is a pump dedicated solely to the purpose of the apparatus of the invention. However, in certain other embodiments, the vacuum pump can be provided in the form a device adapted to create suction for other uses, such as, e.g., a vacuum cleaner for cleaning rugs and flooring.

Further, the apparatus includes a drainage portal. In certain examples, the drainage portal is located on the tank and empties into the outside environment. In certain examples, the drainage portal further includes tubing coupled to the drainage portal, so that a user may direct the polluted mixture of water and nonfoaming detergent flowing out of the tank to a drainage sink.

The apparatus is used by first partially filling the tank with a mixture of water and nonfoaming detergent. In the preferred embodiment, water is poured into the tank through an inlet capable of receiving water and the nonfoaming detergent is poured into the tank through an inlet capable of receiving the nonfoaming detergent. In certain embodiments, a single inlet may function as the inlet capable of receiving water and the inlet capable of receiving nonfoaming detergent, which can be added separately or together as a mixture. Further, in additional embodiments, other substances may be added to the mixture, such as antimicrobial liquids to aid in reducing the need to clean the inside of the tank. The user then activates a vacuum pump. As described above, the vacuum pump pulls clean air out of the tank, creating a vacuum within the tank that enables polluted air entering the tank to be sparged by the disk sparger into the mixture of water and nonfoaming detergent. After periods of extended use, the water may become tinted in color, indicating the water has retained pollutants from the environment surrounding the tank. When the water becomes darker in color (i.e., looks dirty), the user may then empty the tank to replace the water and detergent mixture. The leftover pollutants are emptied from the tank through a drainage portal, and a clean water and nonfoaming detergent mixture is then replaced within the tank for its next use cycle. In certain examples, tubing is attached to the drainage portal to assist in directing the exiting dirty water. As a nonlimiting example, this feature permits a user to empty a tank into a sink without lifting the tank. In an alternative embodiment, the tank may lack one or more of the water inlet, detergent inlet and drainage portal, and instead have a lid which can be removed to periodically add clean water and detergent and to remove dirty water.

In certain examples, a mixture of water and nonfoaming detergent is used wherein the nonfoaming detergent is between 1-6% of the mixture. In certain preferred examples, the nonfoaming detergent is 4% of the mixture.

FIG. 1 shows a schematic view of an exemplary embodiment of the air cleaning apparatus 10. Apparatus 10 includes tank 11, wherein the tank is designed to hold mixture 22 of water and nonfoaming detergent. The tank includes detergent inlet 16 capable of receiving nonfoaming detergent and water inlet 12 capable of receiving water. In certain examples, such as in FIG. 1, inlets 16 and 12 are separate inlets, wherein in other examples, a single inlet may serve as an inlet capable of receiving the water and detergent together or separately. Apparatus 10 further includes air inlet 14, wherein air from the external environment surrounding the apparatus enters tank 11. Additionally, apparatus 10 includes air outlet 18, which is located above maximum liquid fill line 28 of tank 11. Apparatus 10 also includes disk sparger 24, which injects external air from air inlet 14 into water/detergent mixture 22 as numerous fine air bubbles 20. In FIG. 1, disk sparger 24 is a sintered disk. Water/detergent mixture 22 removes pollutants from air bubbles 20, retaining pollutants in mixture 22 while clean air is released into air cavity 30 of tank 11. Vacuum pump 32 pulls the clean air through the air outlet 18, creating reduced pressure inside tank 11, which pulls further polluted air into tank 11 via air inlet 14. The suction force provided in tank 11 by vacuum pump 32 can be modified (e.g., decreased, increased or terminated) using valve 34 between air outlet 18 and vacuum pump 32. In certain embodiments, tank 11 is drained via drainage portal 26, wherein the water/detergent mixture 22 is emptied directly from tank 11. In examples draining directly from tank 11, tubing 36 is optionally connected to the drainage portal 26 to aid ease of drainage.

A method of use of air cleaning apparatus 10 includes partially filling tank 11 with mixture 22 comprising water and detergent. In the embodiment of FIG. 1, water is poured into the tank through water inlet 12 and nonfoaming detergent is poured into the tank through detergent inlet 16. Mixture 22 can comprise other substances, such as antimicrobial agents, to aid in reducing the need to clean the inside of the tank. The user then activates vacuum pump 32 to reduce pressure in tank 11, and thereby pull polluted air through air inlet 14 and disk sparger 24 into mixture 22, which removes pollutants from the air before the air is extracted from the surface of mixture 22 to provide clean air in air cavity 30, which in turn is pulled through air outlet 18, valve 34 (if present) and vacuum pump 32 to the surrounding atmosphere.

A method of assembling air cleaning apparatus 10 includes: a) providing tank 11; b) providing air inlet 14; c) providing detergent inlet 16; d) providing water inlet 12; e) providing air outlet 18; f) providing drainage portal 26; g) providing disk sparger 24 in fluid communication with air inlet 14; and h) providing vacuum pump 32 in fluid communication with air outlet 18. It is to be understood that the entirety of disk sparger 24 is below a maximum fill line of tank 11 and preferably provided at or near the bottom of tank 11. It is also to be understood that air inlet 14, detergent inlet 16, and water inlet 12 are all coupled to tank 11 above the maximum fill line of tank 11 (i.e., above water level).

FIG. 1 further shows the coupling of vacuum pump 32 to air outlet 18. In this nonlimiting example, valve 34 is placed between air outlet 18 and vacuum pump 32. Valve 34 permits a user to turn on, shut off, or adjust the vacuum pump's airflow. It should be understood that any vacuum pump 32 used with the invention includes a standard vent to permit air drawn into the pump to exit the pump to the surrounding atmosphere.

While the invention has been described in detail and with reference to specific examples thereof, it will be apparent to one skilled in the art that various changes and modifications can be made therein without departing from the spirit and scope thereof.

What is claimed is:

1. An air cleaning apparatus comprising:
   a tank, wherein there is no other tank in the air cleaning apparatus;
   a detergent inlet through which a nonfoaming detergent can be fed into the tank;
   a water inlet through which water can be fed into the tank, wherein the water inlet and the detergent inlet are a single common inlet or are two different inlets;
   an air inlet through which air can be fed into the tank;
   at least one sparger in fluid communication with the air inlet;
   a vacuum pump;
   an air outlet in fluid communication with the vacuum pump; and
   at least one valve between the air outlet and the vacuum pump and configured to control flow of fluids through the air outlet,
   wherein the air cleaning apparatus is configured to pull polluted air external to the tank into the tank through the air inlet to the at least one sparger, sparge bubbles of the polluted air from the at least one sparger into a mixture of the water and the nonfoaming detergent in the tank, remove pollutants from the air as it rises through the mixture, extract clean air from the mixture into a cavity in the tank above the mixture and extract the clean air from the cavity through the air outlet and out of the vacuum pump to an external environment.

2. The air cleaning apparatus of claim 1, wherein the tank is fluid-tight, capable of maintaining structural integrity when subjected to vacuum pressure, and comprises at least one material selected from the group consisting of glass, plexiglass, quartz, porcelain, stainless steel, thick-walled plastic and fiberglass.

3. The air cleaning apparatus of claim 1, wherein the at least one sparger is a disk sparger which is a sintered disk.

4. The air cleaning apparatus of claim 1, wherein the at least one sparger comprises at least one of air bubble stones, aluminum, titanium, and steel.

5. The air cleaning apparatus of claim 1, further comprising a drainage portal configured to drain from the tank the mixture of the water and the nonfoaming detergent, and optionally tubing extending from the drainage portal to the external environment.

6. The air cleaning apparatus of claim 1, further comprising tubing externally extending from the water inlet and capable of receiving water, wherein the tubing is configured for connecting to a water source.

7. The air cleaning apparatus of claim 1, wherein the detergent inlet and the water inlet are the single common inlet.

8. The air cleaning apparatus of claim 7, wherein the detergent inlet and the water inlet are an opening in the tank removably sealed by a lid.

9. An air cleaning method comprising the following steps:
   providing the air cleaning apparatus of claim 1;
   partially filling the tank with the mixture of water and nonfoaming detergent,
   activating the vacuum pump to pull polluted air external to the tank into the tank through the air inlet to the at least one sparger;
   sparging bubbles of the polluted air from the at least one sparger into the mixture of the water and the nonfoaming detergent in the tank;
   removing pollutants from the air as the air rises through the mixture;
   extracting clean air from the mixture into the cavity in the tank above the mixture; and
   extracting the clean air from the cavity through the air outlet and out of the vacuum pump to the external environment.

10. The method of claim 9, wherein the mixture of water and nonfoaming detergent comprises from 1 to 6 wt. % of the nonfoaming detergent in water.

11. The method of claim 9, further comprising adjusting a valve between the vacuum pump and the air outlet to alter a vacuum force applied to the tank.

12. The method of claim 9, wherein the water is poured into the tank through the water inlet and the nonfoaming detergent is poured into the tank through detergent inlet.

13. The method of claim 9, wherein a removable lid is removed from the tank to pour the water and the nonfoaming detergent into the tank and the removable lid is replaced prior to the activating step.

14. The method of claim 13, further comprising removing the removable lid to remove and replace the mixture of water and nonfoaming detergent in the tank, and replacing the removable lid prior to further conducting the activating step.

15. The method of claim 9, further comprising draining the mixture of water and nonfoaming detergent through the drainage portal.

16. The method of claim 9, wherein the clean air has less of the pollutants than the polluted air and is odorless.

17. A method of assembling the air cleaning apparatus of claim 1, said method comprising the following steps:
   a) providing said tank;
   b) providing said air inlet;
   c) providing said inlet capable of receiving nonfoaming detergent;
   d) providing said inlet capable of receiving water;
   e) providing said air outlet;
   f) providing said at least one sparger in fluid communication with the air inlet; and
   g) providing said vacuum pump in fluid communication with the air outlet.

18. The method of claim 17, wherein the tank has a height that is 3-4 times a width of the tank, and the at least one sparger covers an entire bottom of the tank.

19. The air cleaning apparatus of claim 1, wherein the tank has a height that is 3-4 times a width of the tank, and the at least one sparger covers an entire bottom of the tank.

* * * * *